(12) United States Patent
Deville

(10) Patent No.: US 10,259,114 B2
(45) Date of Patent: Apr. 16, 2019

(54) HANDLE ASSEMBLY SYSTEM FOR A HAND TOOL

(71) Applicant: Deville SA, Bauge (FR)

(72) Inventor: Antoine Deville, Beauge en Anjou (FR)

(73) Assignee: DEVILLE SA, Bauge (FR)

( * ) Notice: Subject to any disclaimer, the term of this patent is extended or adjusted under 35 U.S.C. 154(b) by 55 days.

(21) Appl. No.: 15/198,774

(22) Filed: Jun. 30, 2016

(65) Prior Publication Data

US 2017/0001297 A1    Jan. 5, 2017

(30) Foreign Application Priority Data

Jul. 2, 2015  (FR) ..................... 15 56262

(51) Int. Cl.
| | | |
|---|---|---|
| *B25G 3/30* | (2006.01) | |
| *B25G 1/04* | (2006.01) | |
| *A01G 3/025* | (2006.01) | |
| *B25G 3/38* | (2006.01) | |

(52) U.S. Cl.
CPC .............. *B25G 3/30* (2013.01); *A01G 3/0251* (2013.01); *A01G 3/0255* (2013.01); *B25G 1/04* (2013.01); *B25G 3/38* (2013.01)

(58) Field of Classification Search
CPC ............... B25G 3/30; B25G 3/38; B25G 1/04
See application file for complete search history.

(56) References Cited

U.S. PATENT DOCUMENTS

| | | | |
|---|---|---|---|
| 4,905,548 A | 3/1990 | Colace | |
| 7,216,414 B2 * | 5/2007 | Schaefer | B25G 3/00 |
| | | | 29/508 |
| 7,458,902 B2 * | 12/2008 | Gill | A01K 87/08 |
| | | | 473/299 |
| 7,549,195 B2 * | 6/2009 | Bensussan | B25G 1/04 |
| | | | 15/144.4 |
| 9,102,051 B2 * | 8/2015 | Chen | B25G 1/04 |
| 9,427,854 B2 * | 8/2016 | Leighton | B25B 13/06 |
| 2001/0047570 A1 | 12/2001 | Lanz | |
| 2008/0276429 A1 | 11/2008 | Bukovitz | |
| 2009/0235512 A1 | 9/2009 | Bensussan | |
| 2014/0000065 A1 | 1/2014 | Bukovitz | |
| 2014/0366327 A1 * | 12/2014 | Huang | B25G 1/04 |
| | | | 16/421 |
| 2015/0272314 A1 * | 10/2015 | Vandenbroucke | A47L 13/22 |
| | | | 401/268 |
| 2016/0288311 A1 * | 10/2016 | Ferris | B25G 1/04 |
| 2017/0106524 A1 * | 4/2017 | Ubeto | B25G 1/04 |

OTHER PUBLICATIONS

Search Report dated May 4, 2016 out of French Priority Application No. 1556262 (7 pages).

* cited by examiner

*Primary Examiner* — Victor D Batson
*Assistant Examiner* — Matthew J Sullivan
(74) *Attorney, Agent, or Firm* — Brinks Gilson & Lione; John C. Freeman

(57) ABSTRACT

A handle assembly system includes first and second handle sections intended to be assembled with one another. The first and second handle sections include complementary threads that cooperate to retain the first and second handle sections. The system also includes a friction seal interposed between the first and second handle sections.

8 Claims, 1 Drawing Sheet

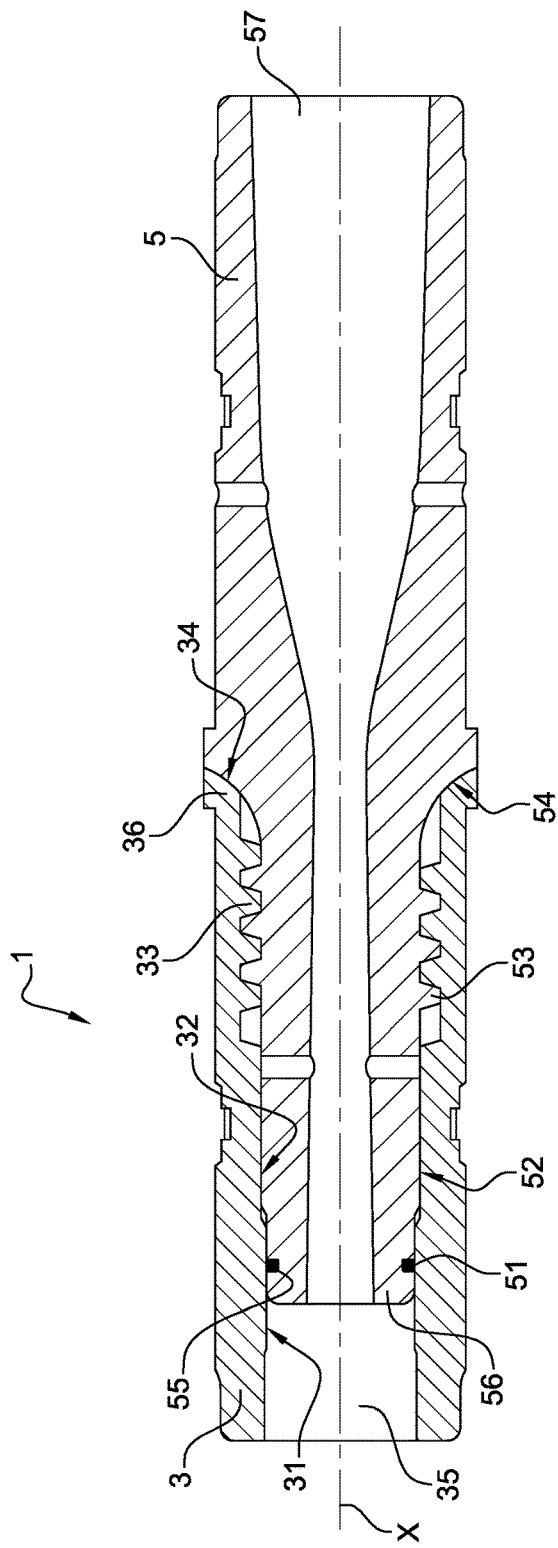

HANDLE ASSEMBLY SYSTEM FOR A HAND TOOL

This application claims priority to French Patent Application No. 1556262 filed Jul. 2, 2015, the entire contents of which is incorporated herein by reference.

BACKGROUND

The invention relates to a handle assembly system for a hand tool, in particular for a hand tool of great length like a pruner for example.

SUMMARY

Hand tools of great length like a pruner comprise either a pole of great length or one or two handles of great length. The handle or the pole is therefore in several sections which are assembled one after the other. For transport and storage reasons, these hand tools of great length must be able to be dismantled relatively easily. However, this dismantling must be possible only deliberately. It must not be able to occur while using the hand tool of great length. To this end, means for securing an assembly of two of the handle sections together are provided. Currently, these securing means are abutment or buttress-based, as described in the documents US 2014/0000065 and US 2009/0235512. They are devices that can be disconnected to allow disassembly. Because of this, they are complex, because they comprise numerous parts, and fragile.

One aim of the invention is to provide a system for assembling handle sections which is simple and robust.

To this end, there is provided, according to the invention, a handle assembly system comprising first and second handle sections intended to be assembled with one another, means for retaining one of the first and second handle sections in the other of the first and second handle sections and means for securing an assembly of the first and second handle sections, the means for securing an assembly being friction securing means.

Advantageously, but optionally, the assembly system according to the invention presents at least one of the following additional technical features:

the friction securing means comprise a friction seal interposed between the first and second handle sections.

one of the first and second handle sections comprises an annular groove for receiving the friction seal.

the other of the first and second handle sections comprises a bearing surface that can extend facing the annular groove.

the retaining means comprise a threading making it possible to screw one of the first and second handle sections into the other of the first and second handle sections.

the threading is a trapezoidal threading.

the assembly system further comprises load take-up means between the first and second handle sections.

the load take-up means comprise a first portion of one of the first and second handle sections and a second portion of the other of the first and second handle sections, the first and second section portions being complementary in form to one another.

the first and second portions are cylindrical of revolution.

the load take-up means are placed between the means for securing an assembly and the retaining means.

BRIEF DESCRIPTION OF THE DRAWINGS

Other features and advantages of the invention will become apparent from the following description of a preferred embodiment of the invention. In the attached drawing:

FIG. 1 is a cross-sectional view of an assembly system according to the invention.

DETAILED DESCRIPTION

Referring to FIG. 1, a handle assembly system 1 according to the invention will be described. The handle assembly system 1 here comprises two handle sections 3, 5.

The first handle section 3 is generally cylindrical of revolution of longitudinal axis X. The first handle section 3 is hollow: it includes a void 35 emerging on the longitudinal axis X at an end 36. From this end 36, the first handle section 3 comprises, in succession from right to left in FIG. 1:

an end surface which is a bearing surface 34 forming a bearing abutment of the first handle section 3;

a first part comprising a threading 33. The threading 33 here is a trapezoidal threading. Other types of threading can be used as variant embodiments. The threading 33 extends longitudinally over a first predetermined length of the void 35 of the first handle section 3.

a second part comprising a first portion 32 that is, here, cylindrical of revolution of axis X. This first portion 32 is formed by a lateral contact surface delimiting, in this first portion 32, the void 35 of the first handle section 3. Once again, this first portion 32 extends longitudinally over a second predetermined length of the void 35 of the first handle section 3.

a third part comprising a bearing surface 31 which extends longitudinally over a third predetermined length of the void 35 of the first handle section 3. The bearing surface 31 is cylindrical of revolution of axis X and delimits, in the third part, the void 35 of the first handle section 3.

The second handle section 5 also is generally cylindrical of revolution of longitudinal axis X. The second handle section 5 is hollow: it comprises a void 57 emerging on the longitudinal axis X at an end 56. From this end 56, the second handle section 5 comprises, in succession from left to right in FIG. 1:

an annular groove 55 produced on an outer lateral wall of the end 56 of the second handle section 5. The annular groove 55 receives a friction seal 51. The friction seal 51 extends, radially in a centrifugal manner, to protrude from the outer lateral wall.

a first part comprising a second portion 52 that here is cylindrical of revolution of axis X. This second portion 52 is formed by a lateral contact surface forming, in this second portion 52, the lateral wall of the second handle section 5. This second portion 52 extends longitudinally over a length at least substantially equivalent to the second predetermined length of the void 35 of the first handle section 3.

a second part comprising a threading 53. The threading 53 here is a trapezoidal threading. Other types of threading can be used as variant embodiments. The threading 53 extends longitudinally over a length at least substantially equivalent to the first predetermined length of the void 35 of the first handle section 3.

an end surface which is a bearing surface 54 forming a bearing abutment of the second handle section 5.

The threadings 33 and 53 are complementary to one another. The same applies to the first 32 and second 52 portions which have forms complementing one another. The first portion 32 is a female portion and the second portion 52 is a male portion.

There now follows a description of an assembly of the first 3 and second 5 handle sections with one another.

The end 56 of the second handle section 5 is introduced, along the longitudinal axis X, into the void 35 of the first handle section 3, then the second handle section 5 is screwed by making the threadings 33 and 53 cooperate with one another, until the bearing surface 54 of the second handle section 5 comes to bear on the bearing surface 34 upon tightening. The two bearing surfaces 34, 54 then form a bearing abutment of the assembly system 1 according to the invention. The threadings 33 and 53 then form retaining means of the assembly system 1 according to the invention.

Once the second handle section 5 has been tightened in the first handle section 3, the first 32 and second 52 portions are in contact with one another because of their complementarity of form and of a sliding fit thus produced between the two portions 32, 52. They extend facing, and in contact with, one another. The first 32 and second 52 portions then form load take-up means of the assembly system 1 according to the invention. That makes it possible to transmit flexural loads, in particular, from one of the first 3 and second 5 handle sections to the other of the first 3 and second 5 handle sections.

Also, once the second handle section 5 has been tightened in the first handle section 3, the friction seal 51 is crushed into the annular groove 55 by bearing of the bearing surface 31 of the first handle section 3 which then extends facing the annular groove 55. The crushing of the friction seal 51 makes it possible to secure the tightening thus produced between the first 3 and second 5 handle sections. The annular groove 55, the friction seal 51 and the bearing surface 31 form means for securing by friction an assembly of the assembly system 1 according to the invention.

Obviously, numerous modifications can be brought to the invention without in any way departing from the scope thereof.

The invention claimed is:

1. A handle assembly system comprising:
   first and second handle sections intended to be assembled with one another, the first handle section having a first cross-sectional radius and comprising a first end bearing surface to define a first bearing abutment and the second handle section comprising a second end bearing surface to define a second bearing abutment;
   threads provided on the first handle section complementary to threads provided on the second handle section that, when engaged, retain one of the first and second handle sections in the other of the first and second handle sections; and
   a friction seal interposed between the first and second handle sections to secure an assembly of the first and second handle sections, wherein when the threads are completely engaged, the first hearing abutment contacts the second bearing abutment, wherein the first handle section comprises a bearing surface, having a reduced cross-sectional radius with respect to the first cross-sectional radius, that extends longitudinally over a predetermined length of a void of the first handle section, wherein the friction seal is crushed predominantly radially by the bearing surface of the first handle section against the second handle section, when the threads of the first handle section and the threads of the second handle section are completely engaged, wherein the second handle section comprises an annular groove for receiving the friction seal and formed on an outer lateral wall of the second handle section, wherein when the threads of the first handle section and the threads of the second handle section are completely engaged the bearing surface of the first handle section extends facing the annular groove and the friction seal is crushed into the annular groove by bearing of the beating. surface of the first handle section.

2. The system according to claim 1, wherein the bearing surface of the first handle section faces the annular groove.

3. The assembly system according to claim 1, wherein the threading is a trapezoidal threading.

4. The assembly system according to claim 1, further comprising a first portion of one of the first and second handle sections and a second portion of the other of the first and second handle sections, the first and second portions being complementary in form to one another in order to enable load take up.

5. The assembly system according to claim 4, wherein the first and second portions are cylindrical.

6. The assembly system according to claim 4, wherein the first portion and the second portion are located between the threads and the friction seal.

7. The assembly according to claim 4 wherein the first and second portions contact each other when the threads are completely engaged.

8. A handle assembly comprising:
   a first handle section having a first cross-sectional radius and a distal end with a first bearing abutment having a reduced cross-sectional radius with respect to the first cross-sectional radius;
   a second handle section having a distal end, the second handle section having a second bearing abutment, proximal of the second handle section distal end;
   threads provided on the first handle section complementary to threads provided on the second handle that, when engaged, retain the first and second handle sections; and
   a friction seal interposed between the first and second handle sections to secure the first and second handle sections, wherein when the threads are completely engaged, the first bearing abutment contacts the second bearing abutment and the friction seal is predominantly crushed radially.

* * * * *

UNITED STATES PATENT AND TRADEMARK OFFICE
CERTIFICATE OF CORRECTION

PATENT NO. : 10,259,114 B2  
APPLICATION NO. : 15/198774  
DATED : April 16, 2019  
INVENTOR(S) : Antoine Deville Page 1 of 1

It is certified that error appears in the above-identified patent and that said Letters Patent is hereby corrected as shown below:

In the Claims

In Column 3, Claim 1, Line 49, delete "hearing" and replace with --bearing--.

In Column 4, Claim 1, Line 16, delete "beating." and replace with --bearing--.

Signed and Sealed this  
Thirty-first Day of December, 2019

Andrei Iancu  
*Director of the United States Patent and Trademark Office*